US011738699B2

(12) United States Patent
Czerkas et al.

(10) Patent No.: US 11,738,699 B2
(45) Date of Patent: Aug. 29, 2023

(54) VEHICLE INTERIOR COMPONENT AND METHOD OF MAKING A VEHICLE INTERIOR COMPONENT

(71) Applicant: Faurecia Interior Systems, Inc., Auburn Hills, MI (US)

(72) Inventors: Maciej Czerkas, Simpsonville, NC (US); Joseph Massetti, Algonac, MI (US); Benjamin Outman, Pontiac, MI (US)

(73) Assignee: Faurecia Interior Systems, Inc., Auburn Hills, MI (US)

( * ) Notice: Subject to any disclaimer, the term of this patent is extended or adjusted under 35 U.S.C. 154(b) by 608 days.

(21) Appl. No.: 16/783,966

(22) Filed: Feb. 6, 2020

(65) Prior Publication Data

US 2021/0245680 A1 Aug. 12, 2021

(51) Int. Cl.
*B60R 13/02* (2006.01)
*B32B 37/16* (2006.01)
(Continued)

(52) U.S. Cl.
CPC ............... *B60R 13/02* (2013.01); *B32B 5/18* (2013.01); *B32B 7/09* (2019.01); *B32B 37/06* (2013.01); *B32B 37/16* (2013.01); *B32B 38/00* (2013.01); *B32B 2038/008* (2013.01); *B32B 2262/101* (2013.01); *B32B 2266/0278* (2013.01); *B32B 2305/022* (2013.01); *B32B 2323/10* (2013.01); *B32B 2355/02* (2013.01); *B32B 2369/00* (2013.01); *B32B 2451/00* (2013.01); *B32B 2605/003* (2013.01); *B32B 2605/08* (2013.01)

(58) Field of Classification Search
CPC .. B60R 13/02; B32B 5/18; B32B 7/09; B32B 37/06; B32B 37/16; B32B 38/00; B32B 2038/008; B32B 2451/00; B32B 2605/003; B32B 2605/08; B32B 2038/047; B32B 3/266; B32B 5/245; B32B 2601/00; B32B 38/04
See application file for complete search history.

(56) References Cited

U.S. PATENT DOCUMENTS

2010/0068425 A1\* 3/2010 Boinais ................... B32B 27/18
428/32
2010/0171333 A1\* 7/2010 Smith ............... B29C 45/14811
156/93

(Continued)

FOREIGN PATENT DOCUMENTS

DE 102015011157 A1 3/2016
EP 3177761 A1 6/2017
WO WO2016022479 A1 2/2016

*Primary Examiner* — Cynthia L Schaller
(74) *Attorney, Agent, or Firm* — REISING ETHINGTON P.C.

(57) ABSTRACT

A vehicle interior component and method of making a vehicle interior component where a plurality of hollow stitch acceptance holes are formed in a component substrate to accommodate a stitch seam in a decorative covering that is attached to the component substrate. The stitch seam extends through the decorative covering to create filled stitch acceptance holes from the hollow stitch acceptance holes. The stitch seam can be created after an in-mold grain process in which the component substrate and decorative covering are laminated together.

15 Claims, 7 Drawing Sheets

(51) Int. Cl.
  *B32B 7/09*    (2019.01)
  *B32B 38/00*   (2006.01)
  *B32B 37/06*   (2006.01)
  *B32B 5/18*    (2006.01)

(56) References Cited

U.S. PATENT DOCUMENTS

| | | | |
|---|---|---|---|
| 2011/0030596 A1* | 2/2011 | Boinais | D05B 1/08 |
| | | | 112/402 |
| 2014/0339843 A1 | 11/2014 | Wenzel et al. | |
| 2016/0361837 A1* | 12/2016 | Hayes | B29C 43/183 |
| 2019/0016242 A1 | 1/2019 | Kato et al. | |
| 2019/0275930 A1 | 9/2019 | Cho et al. | |
| 2020/0238581 A1* | 7/2020 | Takamura | B29C 45/14786 |
| 2020/0391673 A1* | 12/2020 | Seo | B32B 15/08 |

* cited by examiner

VEHICLE INTERIOR COMPONENT AND METHOD OF MAKING A VEHICLE INTERIOR COMPONENT

TECHNICAL FIELD

The present disclosure is related generally to vehicle interior components having stitch seams and, more particularly, to forming stitch seams in vehicle interior components.

BACKGROUND

Vehicle interior components oftentimes include decorative coverings over component substrates with one or more stitch seams formed in the decorative coverings. In some instances, the stitching can extend through both the component substrate and the decorative covering. For example, US 2019/0016242 to Kato et al. and EP 3177761 to Wenzel et al. disclose vehicle interior components where the stitch seam extends through both the component substrate and the decorative covering. However, in these vehicle interior components, the holes in the component substrate are formed during the stitching process. In Kato et al., the sewing needle itself is used to pierce the substrate, and in Wenzel et al., an awl is used to penetrate the decorative covering and substrate just before the thread is inserted. These methods can create drag in the stitching process, can overheat various components used during the process, and may require additional forming equipment than the methods and components described herein.

SUMMARY

An illustrative method of making an interior vehicle component includes the steps of forming a plurality of hollow stitch acceptance holes in a component substrate; attaching a decorative covering to the component substrate having the plurality of hollow stitch acceptance holes; and stitching through the decorative covering and at least some of the hollow stitch acceptance holes of the plurality of hollow stitch acceptance holes to form a stitch seam that extends through the decorative covering and creates filled stitch acceptance holes in the at least some of the hollow stitch acceptance holes.

In some embodiments, the attaching step includes laminating the decorative covering to the component substrate in a thermo-covering process.

In some embodiments, the thermo-covering process is an in-mold grain lamination process that imparts a surface texture on an outer surface of the decorative covering.

In some embodiments, the thermo-covering process is an in-mold grain lamination process that creates a molded-in trench in the decorative covering.

In some embodiments, the molded-in trench at least partially follows along a line of the at least some of the hollow stitch acceptance holes.

In some embodiments, the hollow stitch acceptance holes are molded, laser scored, or robot milled into the component substrate.

In some embodiments, the hollow stitch acceptance holes include a flashing on an outer surface of the component substrate.

In some embodiments, hollow stitch acceptance holes in the decorative covering are aligned with the at least some of the hollow stitch acceptance holes of the component substrate.

In some embodiments, the decorative covering includes a skin layer and a foam layer.

In some embodiments, the stitch seam is a chain stitch that includes a single thread pass along an outer surface of the decorative covering, a double pass in each of the filled stitch acceptance holes, and a double pass along an inner surface of the component substrate.

In some embodiments, each hollow stitch acceptance hole of the plurality of hollow stitch acceptance holes have a hole cross-sectional profile, and wherein the hole cross-sectional profile is oblong.

Also provided is an illustrative interior vehicle component, comprising a decorative covering having an outer surface and an inner surface; a component substrate having a plurality of hollow stitch acceptance holes, an outer surface, and an inner surface, wherein the inner surface of the decorative covering is attached to the outer surface of the component substrate over at least some of the hollow stitch acceptance holes of the plurality of hollow stitch acceptance holes; and a stitch seam that extends through the decorative covering to create filled stitch acceptance holes in the at least some of the hollow stitch acceptance holes.

In some embodiments, the hollow stitch acceptance holes have a hole cross-sectional profile, and the hole cross-sectional profile is oblong.

In some embodiments, a longest dimension of the hole cross-sectional profile is aligned with a direction of the stitch seam.

In some embodiments, the stitch seam is at least partially aligned with a molded-in trench in the decorative covering.

It is contemplated that any number of the individual features of the above-described embodiments and of any other embodiments depicted in the drawings or description below can be combined in any combination to define an invention, except where features are incompatible.

BRIEF DESCRIPTION OF THE DRAWINGS

Illustrative embodiments will hereinafter be described in conjunction with the following figures, wherein like numerals denote like elements, and wherein.

DESCRIPTION OF ILLUSTRATIVE EMBODIMENTS

Described herein are embodiments of vehicle interior components having stitch seams and methods of making such vehicle interior components. The stitch seams are accommodated in hollow stitch acceptance holes that are preformed in the component substrate before the stitching process. The hollow stitch acceptance holes are advantageously molded into the component substrate or laser scored into the substrate before a decorative covering is laminated to the component substrate in an in-mold grain lamination process. This can eliminate the need for an additional thermoforming tool, which thereby reduces manufacturing costs, reduces floor space, and improves cycle time. Moreover, as compared with methods where holes are formed during the stitching process, the current methods can provide vehicle interior components of higher quality, as an awl, needle, etc. of the stitching process that is used to pierce the component substrate can create undesirably shaped holes and result in debris in the thread.

Figure 1:
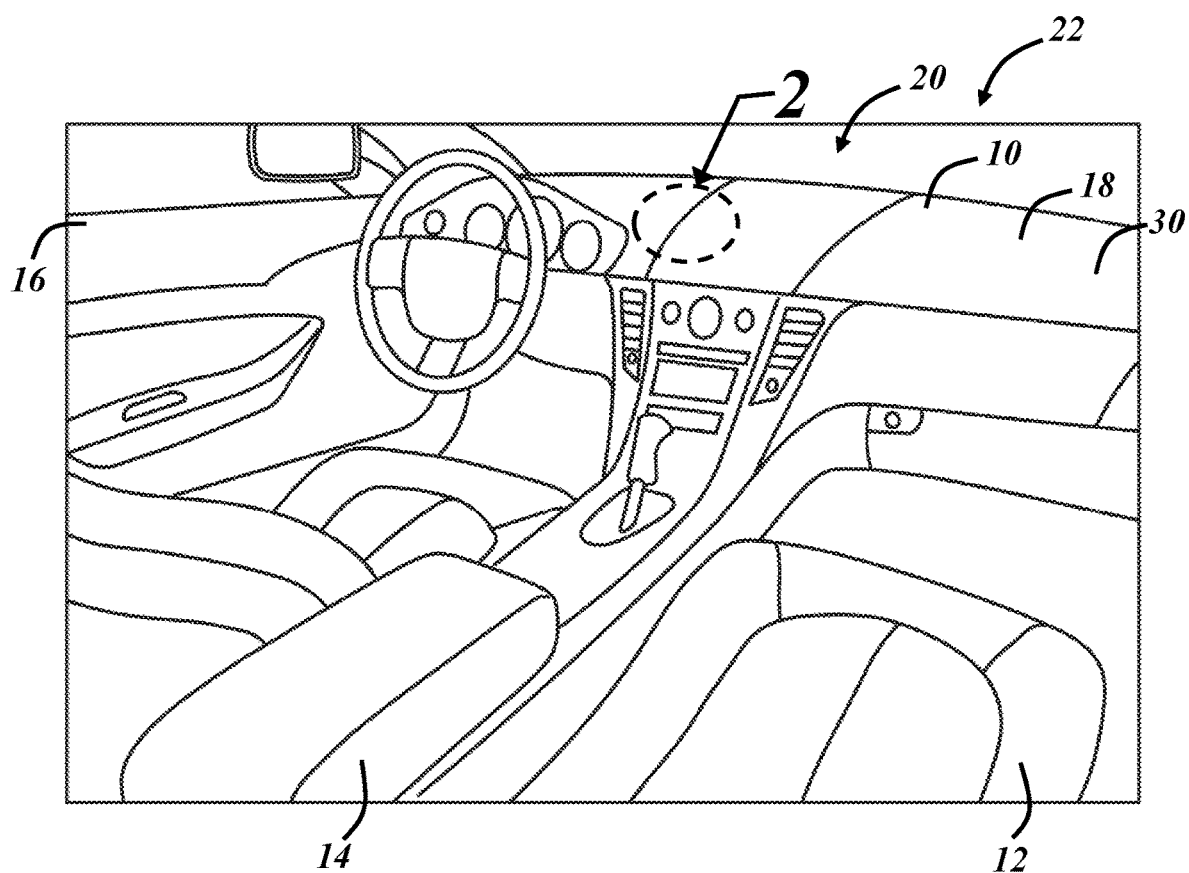
FIG. 1 is a perspective view of the interior of a vehicle passenger cabin equipped with various embodiments of vehicle interior components.

FIG. 1 is a perspective view of example vehicle interior components that may include decorative coverings with stitched seams in accordance with the methods described herein. Instrument panel assembly 10, seat assembly 12, console assembly 14, and door panel assembly 16, to cite just a few examples, may all include decorative coverings 18 disposed over and attached to their respective component substrates. Other vehicle interior components located within an interior cabin 20 of the vehicle 22 may also include decorative covering and stitching as described herein. The description below is focused on the instrument panel assembly 10; however, the methodologies, structures, features, etc. may also be applicable to any other component, such as the seat assembly 12, console assembly 14, door panel assembly 16, and/or any other vehicle component having a stitch seam in decorative covering.

Figure 2:
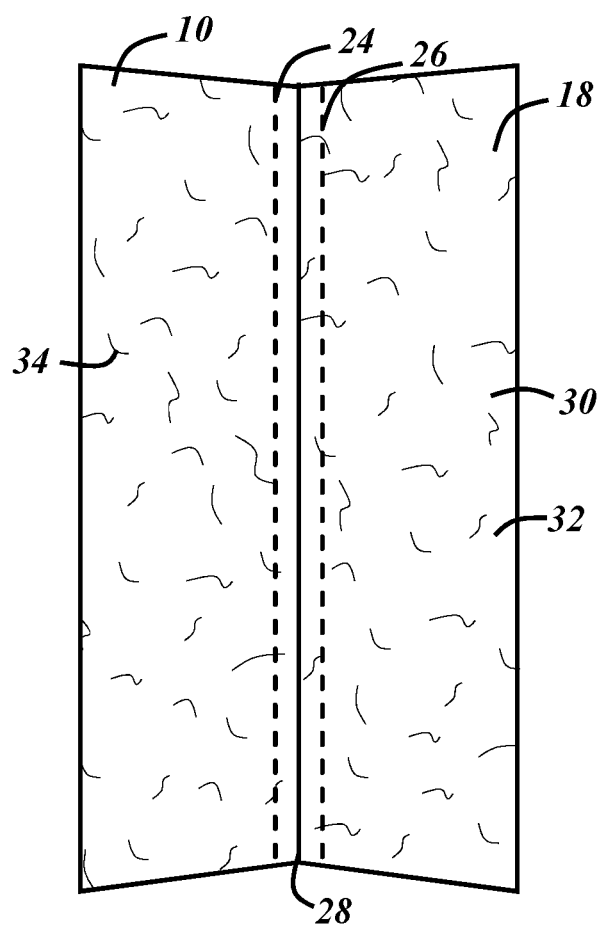
FIG. 2 is a partial view of a vehicle interior component from FIG. 1, showing an example stitch seam.

FIG. 2 is an enlarged, schematic view of two stitch seams 24, 26 located in the instrument panel assembly 10 of FIG. 1. The stitch seams described herein may be functional stitch seams that join separate portions of material, or in some embodiments, the stitch seams may be non-functional or decorative stitch seams that merely provide a certain aesthetic to the various vehicle interior component. The stitch seams 24, 26 are located along and generally follow the path of a portion of a molded-in trench 28. In other words, the stitch seams 24, 26 are generally aligned with, or largely parallel to, a molded-in trench 28 formed in the decorative covering 18 (largely parallel to can mean parallel to, along at least a portion of, within manufacturing tolerances). The decorative covering 18 in this embodiment includes an outermost skin layer 30 that has an outer surface 32 that generally faces toward the interior cabin 20 of the vehicle 22. The outer surface 32 can also be referred to as the A-side. In addition to the molded-in trench 28 formed in the outer surface 32 of the skin layer 30, the skin layer may also include a grain pattern 34. The molded-in trench 28 and/or grain pattern 34 may be imparted into the decorative covering 18 during an in-mold grain lamination process advantageously, as detailed further below, or another thermo-covering process. In other embodiments, there may not be a molded-in trench or grain pattern.

Figure 3:
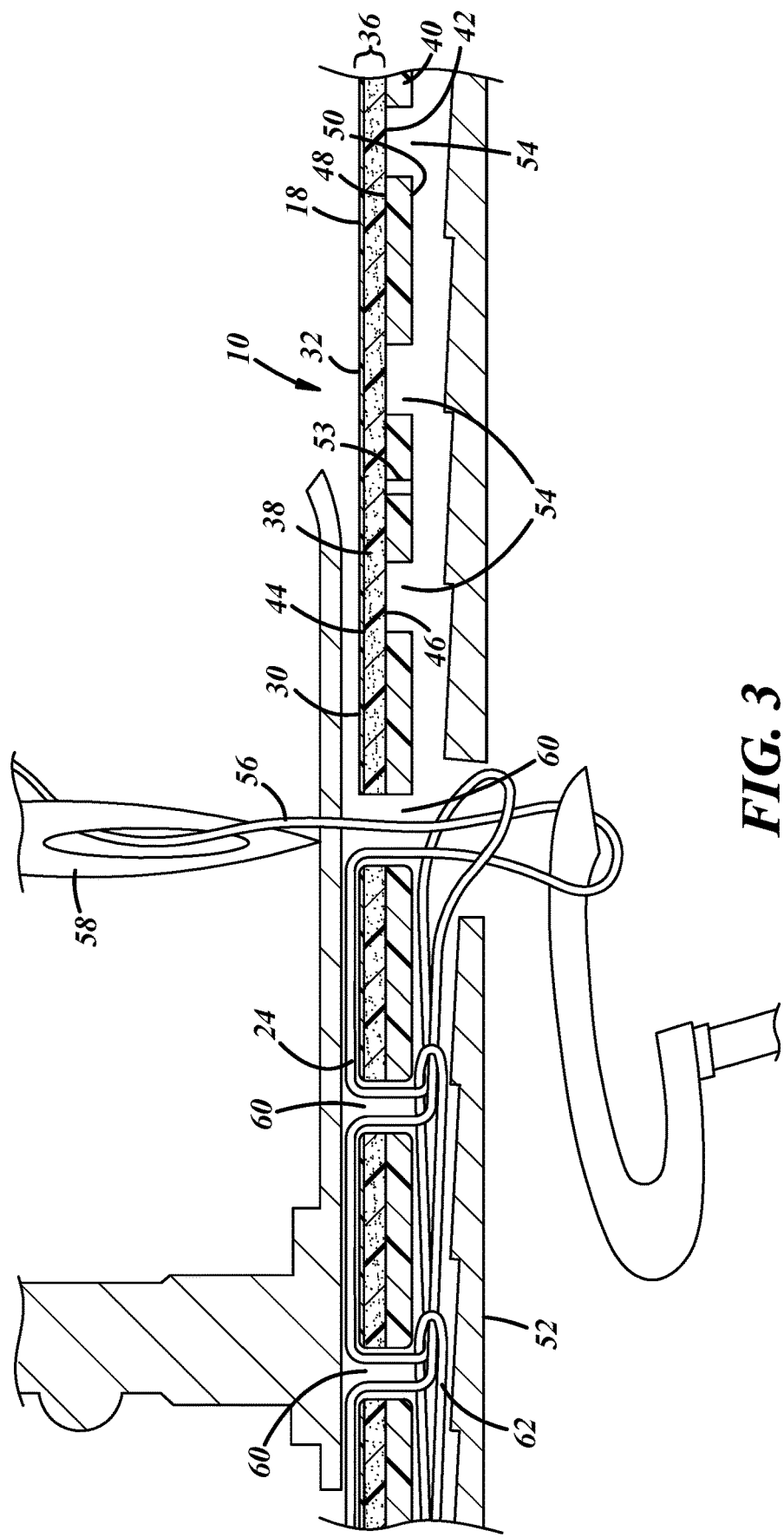
FIG. 3 is partial, cross-sectional view of a vehicle interior component during the stitching process, where the seam is accommodated by hollow stitch acceptance holes that are preformed in the component substrate.

With reference to FIG. 3, the decorative covering 18 includes a multi-layer structure 36 that is comprised of multiple layers of different materials that provide various, structural, functional, aesthetic, and/or tactile qualities. Depending on the implementation, the multi-layer structure 36 can include a skin or foil layer 30 and a foam layer 38. There may be more layers than what is illustrated in FIG. 3, or there could be less layers. For example, other interlayers may be included, such as a spacer and/or one or more adhesive layers. In yet another embodiment, the decorative covering 18 only includes a single skin or foil layer 30 located over the component substrate 40. Further, the layers may be different in configuration and/or composition from what is illustrated and described herein, as the multi-layer structure 36 described herein is merely an example.

The skin layer 30 is the outermost layer of the decorative covering 18 and includes the visible outer side or A-side along the outer surface 32 with an opposite or inner surface 42 against the foam layer 38 toward the component substrate 40. The primary function of the skin layer 30 is to provide a resilient, long-lasting exposed surface within the vehicle with aesthetic appeal to occupants of the passenger cabin, including desirable visual characteristics such as color, shape, and texture. The skin layer 30 may thus include design features visible at the A-side or outer surface 32, such as an embossed grain pattern discussed above with relation to FIG. 2 or a paint film in the desired color. The skin layer 30 may also at least partly provide the decorative covering 18 with desired tactile characteristics in the likeness of furniture upholstery, such as a soft-touch or smooth feel. In some cases, the skin layer 30 is formed with synthetic materials configured with aesthetic characteristics imitating other more expensive materials such as leather (e.g. a thin plastic layer such as thermoplastic olefin (TPO), polyurethane (PUR), polyvinyl chloride (PVC), and/or polypropylene (PP)). In yet other embodiments, the skin layer 30 is a natural material such as leather.

The foam layer 38 may be included to provide desired tactile characteristics to the instrument panel or vehicle component 10. Such tactile characteristics may be in the form of cushioning that compresses when a force is applied to the outer surface or A-side 32 of the panel 10 and decompresses when the force is removed to return the skin layer 30 to its original position. The foam layer 38 has an outer surface 44 that faces the skin layer 30 and an inner surface 46 that faces the component substrate 40 and generally defines the inner surface of the decorative covering 18 and multi-layer structure 36. One suitable foam layer material is polyurethane foam formed from a liquid precursor material comprising a polyol and a diisocyanate. Other foam materials (e.g., polyolefin-based) are possible. The foam layer 38 can also provide sound deadening and/or have a non-uniform thickness to fill space between the skin layer 30 and the component substrate 40 when the respective contours of the skin layer and substrate are different from each other. The foam layer 38 may range in thickness from 1 mm to 10 mm, and it can be separately provided and adhered with adjacent material layers. In other embodiments, a fabric or scrim layer is used in addition to or as an alternative to the foam layer 38. In yet other embodiments, no foam layer is used such that the inner surface 42 of the skin 30 directly interfaces with the component substrate 40 (sometimes via one or more adhesive layers or the like).

The component substrate 40 is typically the most rigid of the illustrated layers of the multi-layer assembly and thereby provides structural support for the overlying decorative covering layer(s) at desired locations within the vehicle 22. The component substrate 40 has an outer surface 48 that faces towards the interior cabin 20 and toward the inner surface 46 of the decorative covering 18. The component substrate 40 has an inner surface 50 that may include various bosses, ribs, grooves, etc. that impart structural benefits and/or promote attachment to other components of the vehicle 22. Advantageously, the stitch seam 24 is located remote from any such features to provide a clear path for the sewing machine stitch plate 52. In some embodiments, since it may be difficult to manipulate the sewing machine stitch plate 52 around a bend or corner, a hinge or living hinge 53 may be provided so the stitch seam 24 can be sewn through the substrate 40 and then the substrate can be moved to its installation position, as schematically represented in FIG. 3. Fiberglass-reinforced polypropylene having a thickness of 1.6 mm to 4 mm is one example of a suitable component substrate 40, but various other types of materials and material combinations and/or different thickness ranges can be employed in a similar manner (e.g., acrylonitrile butadiene styrene (ABS) or polycarbonate ABS (PCABS)). The component substrate 40 is advantageously thicker and more rigid than the skin layer 30.

To enhance the manufacturing process and reduce scrap, among other benefits, the component substrate 40 includes a plurality of preformed hollow stitch acceptance holes 54. As will be detailed further below, the hollow stitch acceptance holes 54 are formed in the component substrate 40 before the decorative covering 18 is laminated thereto, which can provide processing benefits as compared with other methods in which holes are formed during the stitching process itself. For example, in other processes in which holes are formed during the stitching process, debris can get caught in the thread 56. In another example in which holes are formed during the stitching process, the needle 58, awl, or other piercing mechanism can overheat and need to be replaced more frequently. Advantageously, the hollow stitch acceptance holes 54 are laser scored or molded into the component substrate 40. To streamline the manufacturing process, the hollow stitch acceptance holes 54 are formed in the component substrate 40 before an in-mold grain lamination process is carried out with the decorative covering 18.

FIG. 3 schematically illustrates the process of stitching through the decorative covering 18 and at least some of the hollow stitch acceptance holes 54. The stitch seam 24 is formed through the decorative covering 18 and the component substrate 40. The following discussion focuses on stitch seam 24, but is also applicable to other stitch seams located in vehicle interior components, such as the stitch seam 26. Formation of the stitch seam 24 creates filled stitch acceptance holes 60 in the plurality of hollow stitch acceptance holes 54. Accordingly, filled stitch acceptance holes 60 have a thread running therethrough, whereas hollow stitch acceptance holes 54 do not have a thread running therethrough. The stitch seam 24 illustrated in FIG. 3 is a chain stitch 62 having a single thread pass along the outer surface 32 of the decorative covering 18, a double pass in each of the filled stitch acceptance holes 60, and a double pass along the inner surface 50 of the component substrate 40. In another embodiment, the stitch seam 24 may be a lock stitch or another type of stitch. In an advantageous embodiment, the stitch seam 24 begins and ends on the outer surface 32 of the skin layer 30 or decorative covering 18.

The hollow stitch acceptance holes 54 are formed in the component substrate 40 before the decorative covering 18 is attached or situated over the outer surface 48 of the substrate. In some embodiments, hollow stitch acceptance holes 54 may also be formed in the decorative covering 18 and subsequently aligned with the hollow stitch acceptance holes 54 of the covering. The hollow stitch acceptance holes 54 are advantageously either molded into the component substrate 40 when the substrate is initially injection molded, or they are laser scored into a molded substrate. While injection molding of the component substrate 40 is advantageous, other methods of forming the component substrate are certainly possible. Molded-in holes or laser scored holes 54 are advantageous over other holes formed during the stitching process, as a vision scanning system (e.g., robot and camera) can help monitor hole placement and subsequent stitch placement, thereby providing more efficient processing and tighter tolerances. Placement of the hollow stitch acceptance holes 54 can thus be monitored using software that is part of the vision scanning system, which can register placement of the needle 58 during the stitching process so as to correspond the piercing of the decorative covering 18 with the locations corresponding to the holes 54. Thus, the stitch seam 24 placement can be planned further in advance due to the known placement of the hollow stitch acceptance holes 54. In other embodiments, the hollow stitch acceptance holes 54 are formed by milling or robot or hand drilling, to cite a few examples. In any of these embodiments, however, the hollow stitch acceptance holes 54 are formed before attachment of the decorative covering layer 18. This can allow for further process efficiencies, lower costs, and an improved product, as detailed further below.

Forming the hollow stitch acceptance holes 54 in advance of attaching the decorative covering 18 can allow for greater freedom in the hole structure, as the needle 58 or awl is not used during the stitching process to form the hole. As depicted in the top view of FIG. 4, in one embodiment, the hollow stitch acceptance holes 54 have a hole cross-sectional profile 64 that is oblong or oval-shaped. In embodiments where the hole is formed in the substrate during the stitching process, the hole is circular-shaped and does not have the oblong or oval-shaped hole cross-sectional profile 64 illustrated in FIG. 4. Laser-scoring or molding in the holes in the component substrate 40 before attachment to the decorative covering 18 can allow for this advantageous shape in the hole cross-sectional profile 64.

Figure 4:
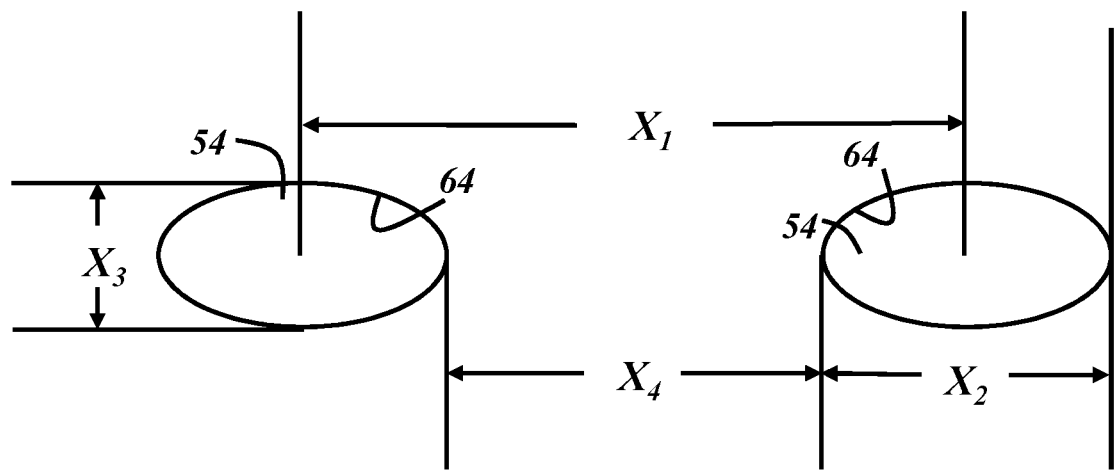
FIG. 4 shows example hole cross-sectional profiles from hollow stitch acceptance holes according to one embodiment.

FIG. 4 illustrates a number of dimensions $X_{1-4}$ relating to the hole-cross sectional profile 64 and can ultimately dictate a number of dimensions relating to the stitch seam 24 once formed. The dimension $X_1$ is the stitch length and also corresponds to the stitch seam direction. This stitch seam direction $X_1$ is aligned with the longest dimension $X_2$ of the hole cross-sectional profile 64. This can provide a more desirable aesthetic appearance. Given the oblong shape of the hole-cross sectional profile, the dimension $X_2$ is the longest dimension of the hole cross-sectional profile 64 whereas the dimension $X_3$ is the shortest dimension of the hole cross-sectional profile ($X_2$ may be deemed the length of the oval-shaped hole 54 and $X_3$ may be deemed the width of the oval-shaped hole 54). Preferably, the dimension $X_2$ is between 1.25 and 2 times greater than the dimension $X_3$. The dimension $X_4$ represents the spacing between holes. In a particularly advantageous embodiment, $X_1$ is 5 mm, $X_2$ is 2 mm, $X_4$ is 1.5 mm, and $X_4$ is 3 mm. Other dimensions are certainly possible and will depend on the desired qualities for the component 10 and the stitch seam 24.

Figure 5:
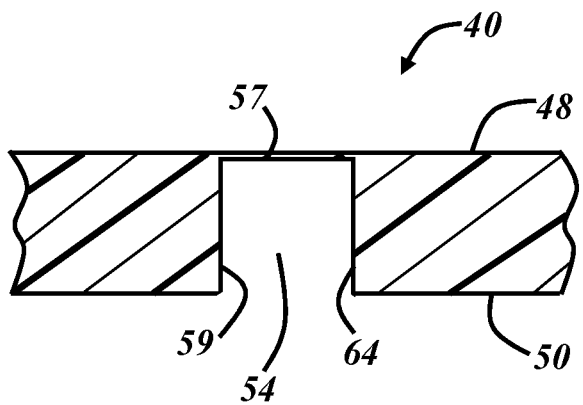
FIG. 5 is a cross-sectional view of a hollow stitch acceptance hole in accordance with one embodiment.

FIG. 5 illustrates another embodiment of a hollow stitch acceptance hole 54. In this embodiment, there is a flashing or flashover 57, which can cover the hole 54 on the outer surface 48 of the substrate 40. This flashed hole 54 results in a small, thin amount of material left at the flashing 57 where the hole is not molded, or otherwise formed, all the way through the thickness of the substrate 40 between the outer and inner surfaces 48, 50. The sidewall 59 of the hole 54 still makes up the majority of the thickness of the substrate 40 between the outer and inner surfaces 48, 50 (e.g., 95-99% of the thickness), which can still result in a clean stitching process.

Figure 6:
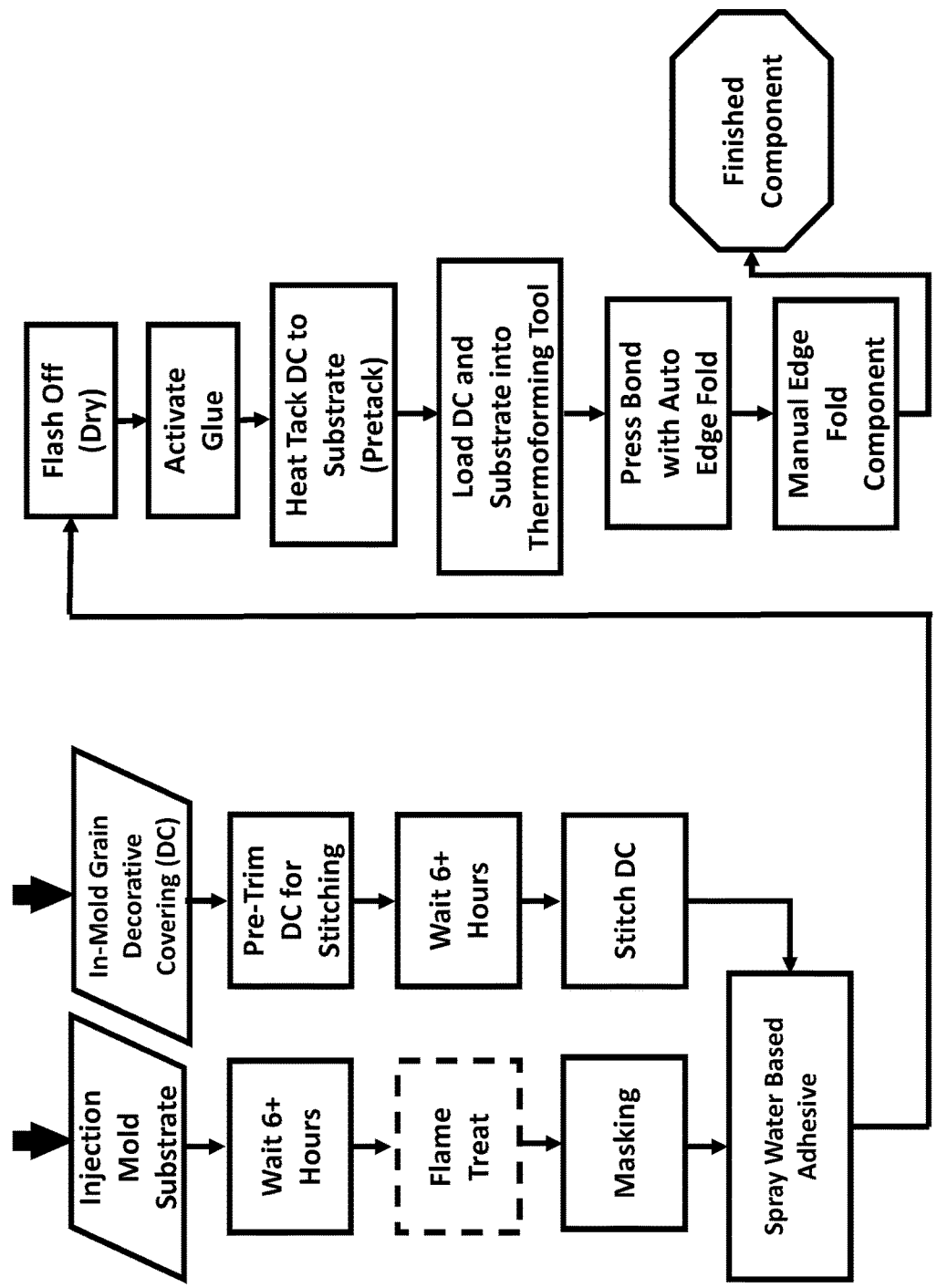
FIG. 6 is a flowchart illustrating an example prior art method of forming a vehicle interior component.
Figure 7:
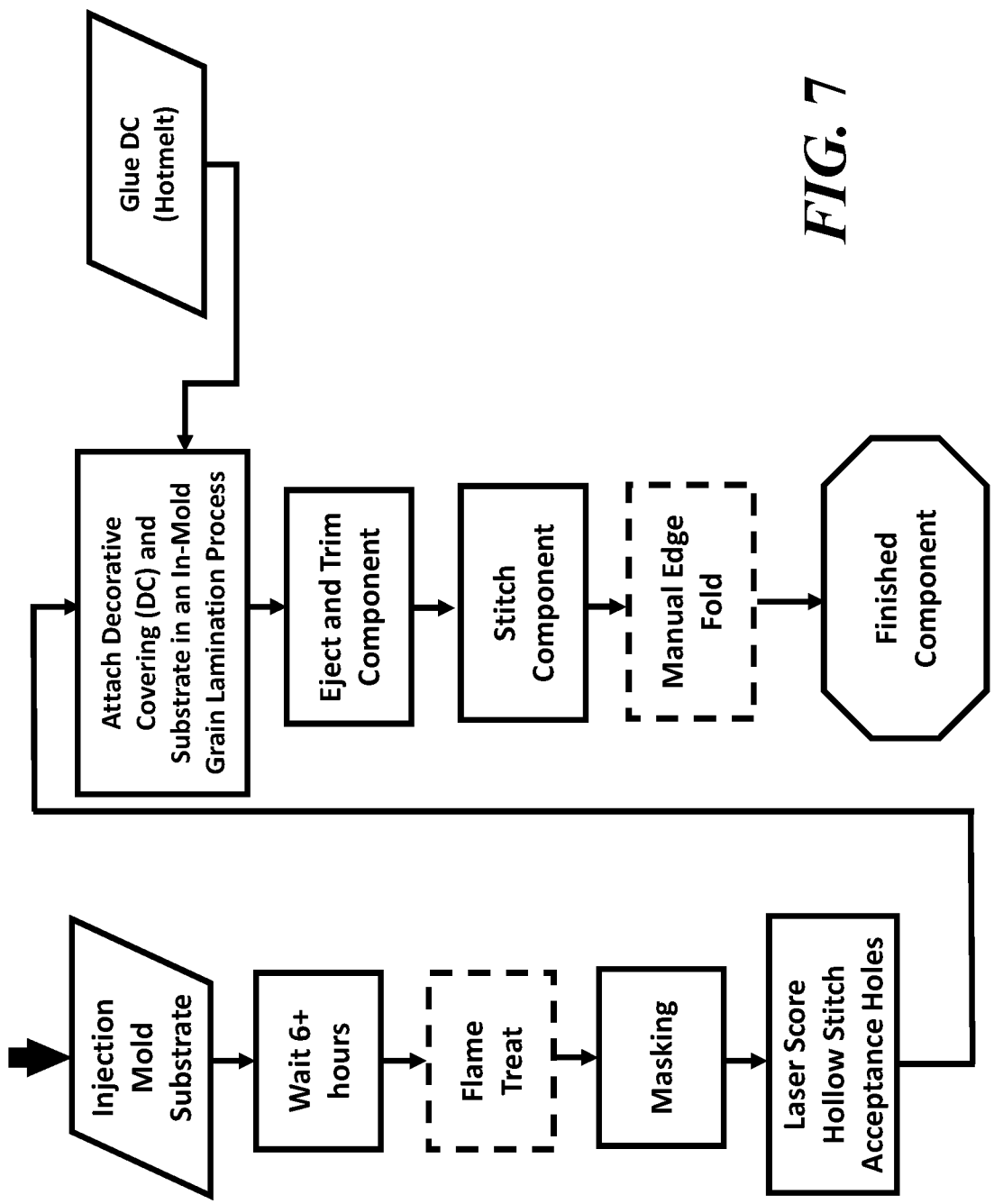
FIG. 7 is a flowchart illustrating a method of forming a vehicle interior component according to one embodiment.
Figure 8:
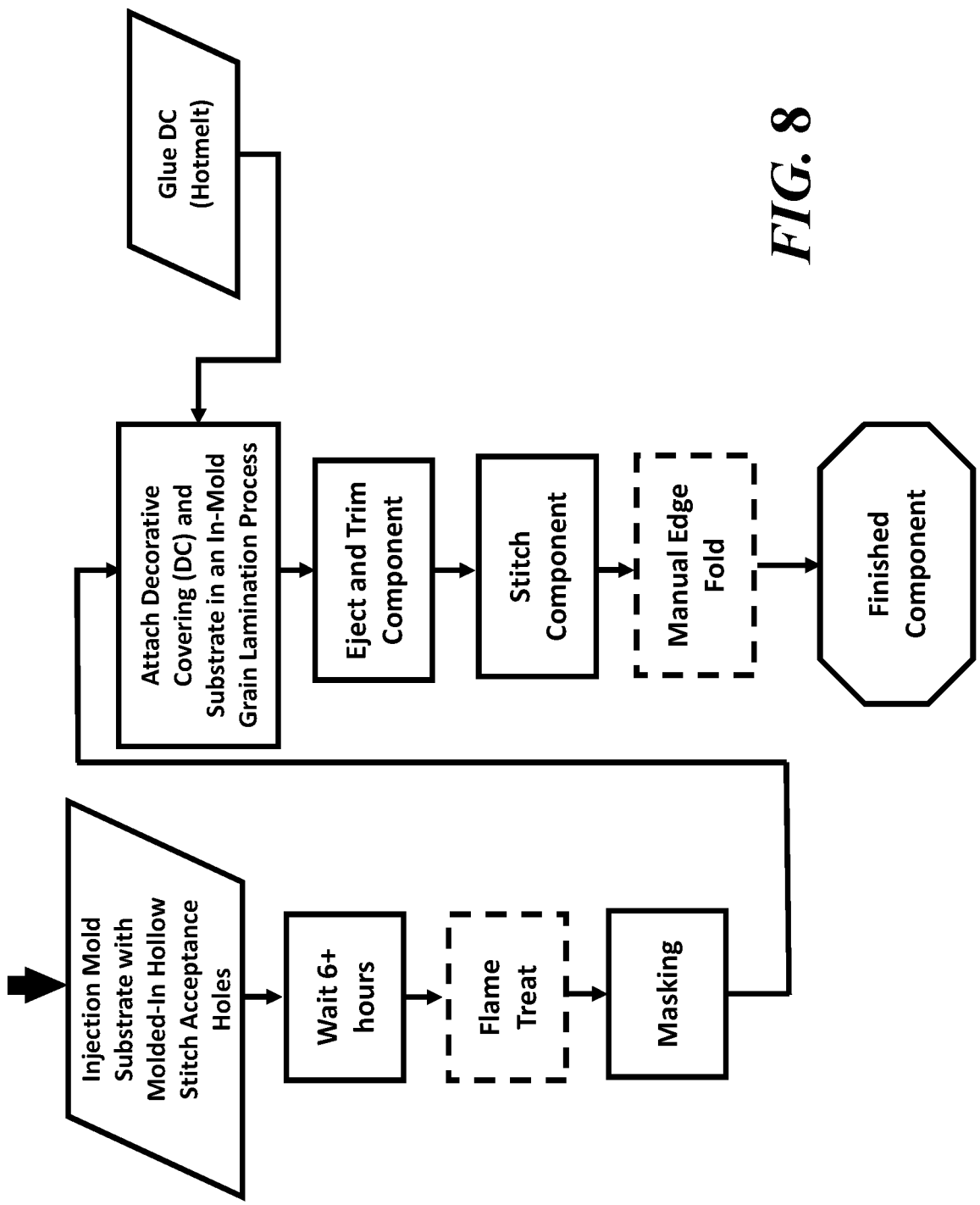
FIG. 8 is a flowchart illustrating a method of forming a vehicle interior component according to another embodiment.

The flowcharts of FIGS. 6-8 illustrate various manufacturing methods, with FIG. 6 illustrating a prior art method of forming a stitch seam and FIGS. 7 and 8 illustrating manufacturing methods that can form the hollow stitch acceptance holes 54, stitch seam 24, and vehicle interior components 10-16 described herein (optional steps shown in dotted lines; e.g., for embodiments in which the substrate is ABS and/or PC, as opposed to PP, the flame treat step may not be required). FIG. 6 illustrates that the substrate is formed, and also, the decorative covering is formed in accordance with the thermo-covering or in-mold grain lamination process. For the FIG. 6 prior art embodiment, hollow stitch acceptance holes 54 are not formed in the substrate before the stitching process. Typically, as shown in FIG. 6, stitching is imparted into the decorative covering before the decorative covering is laminated with the substrate. Accordingly, a thermoforming tool is used to press bond the substrate and the decorative covering.

In the embodiments illustrated in FIGS. 7 and 8, however, the additional thermoforming tool is not required, which can lower capital expenses, lower the number of requisite operators, open up floor space, reduce cost, and improve cycle time. FIG. 7 illustrates an embodiment in which the hollow stitch acceptance holes 54 are laser scored in the formed component substrate 40. FIG. 8 illustrates an embodiment in which the hollow stitch acceptance holes 54 are molded into the component substrate 40. In both embodiments of FIGS. 7 and 8, an adhesive is used to attach the decorative covering 18 to the component substrate 40 which has the hollow stitch acceptance holes 54, and then the multi-layer component is subjected to in-mold grain lamination or another thermoforming process. The in-mold grain lamination process imparts a desired shape three-dimensional shape for the decorative covering 18 and/or skin layer 30 by providing the grain pattern 34 and/or the molded-in trench 28, as shown in FIG. 2. After the in-mold grain lamination process, the stitch seam 24 is stitched into the vehicle interior component 10, through both the decorative covering 18 and the component substrate 40.

As compared with methods in which a needle or awl is used to pierce the substrate during the stitching process, the methods of FIGS. 7 and 8 can prevent debris from interfering with the thread, as well as prevent the piercing components from overheating. Also, by imparting the stitch seam 24 after the thermo-covering or in-mold grain lamination process and attachment of the decorative covering 18 to the component substrate 40, the need for the separate thermoforming tool used to press bond the substrate and the decorative covering, as depicted in FIG. 6, is eliminated. Thus, capital expense is reduced and efficiencies are gained. Moreover, the overall number of steps in the methods of FIGS. 7 and 8 are reduced as compared with the FIG. 6 method. Additionally, with the methods of FIGS. 7 and 8, manual edge folding may not be required, which can further promote efficiency and reduce scrap.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of making a vehicle interior component, comprising the steps of:
    forming a plurality of hollow stitch acceptance holes in a component substrate, wherein one or more hollow stitch acceptance holes extend from an outer surface of the component substrate to an inner surface of the component substrate, wherein the one or more hollow stitch acceptance holes have a hole cross-sectional profile when viewed from the outer surface of the component substrate, and wherein the hole cross-sectional profile is oblong;
    attaching a decorative covering to the component substrate having the plurality of hollow stitch acceptance holes; and
    stitching through the decorative covering and at least some of the hollow stitch acceptance holes of the plurality of hollow stitch acceptance holes to form a stitch seam that extends through the decorative covering and creates filled stitch acceptance holes in the at least some of the hollow stitch acceptance holes.

2. The method of claim 1, wherein the attaching step includes laminating the decorative covering to the component substrate in a thermo-covering process.

3. The method of claim 2, wherein the thermo-covering process is an in-mold grain lamination process that imparts a surface texture on an outer surface of the decorative covering.

4. The method of claim 2, wherein the thermo-covering process is an in-mold grain lamination process that creates a molded-in trench in the decorative covering.

5. The method of claim 4, wherein the molded-in trench at least partially follows along a line of the at least some of the hollow stitch acceptance holes.

6. The method of claim 1, wherein the plurality of hollow stitch acceptance holes are molded, laser scored, or robot drilled into the component substrate.

7. The method of claim 1, wherein the at least some of the hollow stitch acceptance holes include a flashing on an outer surface of the component substrate.

8. The method of claim 1, further comprising hollow stitch acceptance holes in the decorative covering that are aligned with the at least some of the hollow stitch acceptance holes of the component substrate.

9. The method of claim 1, wherein the decorative covering includes a skin layer and a foam layer.

10. The method of claim 1, wherein the stitch seam is a chain stitch that includes a single thread pass along an outer surface of the decorative covering, a double pass in each of the filled stitch acceptance holes, and a double pass along an inner surface of the component substrate.

11. The method of claim 1, wherein the hole cross-sectional profile is oval-shaped.

12. The method of claim 1, wherein a longest dimension of the hole cross-sectional profile is aligned with a direction of the stitch seam.

13. The method of claim 12, wherein the hole cross-sectional profile has a shortest dimension and the longest dimension is between 1.25 and 2 times greater, inclusive, than the shortest dimension.

14. A method of making a vehicle interior component, comprising the steps of:
   forming a plurality of hollow stitch acceptance holes in a component substrate;
   attaching a decorative covering to the component substrate having the plurality of hollow stitch acceptance holes; and
   stitching through the decorative covering and at least some of the hollow stitch acceptance holes of the plurality of hollow stitch acceptance holes to form a stitch seam that extends through the decorative covering and creates filled stitch acceptance holes in the at least some of the hollow stitch acceptance holes, wherein the stitch seam is a chain stitch that includes a single thread pass along an outer surface of the decorative covering, a double pass in each of the filled stitch acceptance holes, and a double pass along an inner surface of the component substrate.

15. A method of making a vehicle interior component, comprising the steps of:
   forming a plurality of hollow stitch acceptance holes in a component substrate;
   attaching a decorative covering to the component substrate having the plurality of hollow stitch acceptance holes by laminating the decorative covering to the component substrate in an in-mold grain lamination process that creates a molded-in trench in the decorative covering, wherein the molded-in trench at least partially follows along a line of at least some of the hollow stitch acceptance holes; and
   stitching through the decorative covering and the at least some of the hollow stitch acceptance holes of the plurality of hollow stitch acceptance holes to form a stitch seam that extends through the decorative covering and creates filled stitch acceptance holes in the at least some of the hollow stitch acceptance holes.

* * * * *